(12) United States Patent
Lee et al.

(10) Patent No.: US 12,367,768 B2
(45) Date of Patent: Jul. 22, 2025

(54) METHOD AND APPARATUS FOR PROCESSING DRIVING COOPERATION MESSAGE

(71) Applicant: ELECTRONICS AND TELECOMMUNICATIONS RESEARCH INSTITUTE, Daejeon (KR)

(72) Inventors: Shin-Kyung Lee, Daejeon (KR); Yoo-Seung Song, Daejeon (KR); Kyoung-Wook Min, Daejeon (KR); Yong-Woo Jo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 256 days.

(21) Appl. No.: 18/098,441

(22) Filed: Jan. 18, 2023

(65) Prior Publication Data

US 2023/0386332 A1 Nov. 30, 2023

(30) Foreign Application Priority Data

May 26, 2022 (KR) .................... 10-2022-0064506

(51) Int. Cl.
*B60W 60/00* (2020.01)
*G08G 1/0967* (2006.01)
*H04L 67/12* (2022.01)

(52) U.S. Cl.
CPC ..... *G08G 1/096791* (2013.01); *B60W 60/001* (2020.02); *G08G 1/096725* (2013.01); *B60W 2556/65* (2020.02); *H04L 67/12* (2013.01)

(58) Field of Classification Search
None
See application file for complete search history.

(56) References Cited

U.S. PATENT DOCUMENTS 10,832,580 B2    11/2020  Park
2018/0255562 A1*  9/2018  Cho ................. H04W 72/566
(Continued)

FOREIGN PATENT DOCUMENTS

KR   10-2021-0053800   5/2021
KR   10-2021-0062354   5/2021
(Continued)

OTHER PUBLICATIONS

Yun Hyeong Seok et al., "A Study on the Autonomous Driving Method in the Intersection Area Using V2X Communication," Korea Institute Of Communication Sciences, Jun. 2021.

*Primary Examiner* — Peter D Nolan
*Assistant Examiner* — Jacob Kent Besteman-Street
(74) *Attorney, Agent, or Firm* — KILE PARK REED & HOUTTEMAN PLLC

(57) ABSTRACT

Disclosed herein are a method and apparatus for processing a driving cooperation message. The method for processing a driving cooperation message includes receiving multiple first driving cooperation messages from neighboring autonomous vehicles, adjusting cooperation classes of the multiple first driving cooperation messages, creating driving strategies corresponding to the adjusted cooperation classes in descending order of priorities of the adjusted cooperation classes, generating second driving cooperation messages including the adjusted cooperation classes and the driving strategies corresponding to the adjusted cooperation classes, and sending the second driving cooperation messages to the neighboring autonomous vehicles requiring cooperative driving.

14 Claims, 10 Drawing Sheets

(56) References Cited

U.S. PATENT DOCUMENTS

| | | | |
|---|---|---|---|
| 2020/0125117 A1* | 4/2020 | Switkes | H04W 4/029 |
| 2021/0129865 A1 | 5/2021 | Jeong et al. | |
| 2021/0182621 A1 | 6/2021 | Suk et al. | |
| 2022/0041180 A1 | 2/2022 | Choi et al. | |
| 2022/0116820 A1* | 4/2022 | Avedisov | H04Q 9/00 |
| 2022/0297700 A1 | 9/2022 | Dougherty et al. | |
| 2022/0332350 A1* | 10/2022 | Jha | B60W 60/0017 |
| 2024/0132105 A1* | 4/2024 | Shin | G08G 1/22 |

FOREIGN PATENT DOCUMENTS

| | | |
|---|---|---|
| KR | 10-2278393 | 7/2021 |
| KR | 10-2021-0108382 | 9/2021 |

\* cited by examiner

| | | PARTIAL AUTOMATION OF DDT | | | COMPLETE AUTOMATION OF DDT | | |
|---|---|---|---|---|---|---|---|
| | | LEVEL 0 | LEVEL 1 | LEVEL 2 | LEVEL 3 | LEVEL 4 | LEVEL 5 |
| | | No Driving Automation (human does all driving) | Driver Assistance (longitudinal OR lateral vehicle motion control) | Partial Driving Automation (longitudinal AND lateral vehicle motion control) | Conditional Driving Automation | High Driving Automation | Full Driving Automation |
| NO COOPERATIVE AUTOMATION | | e.g., Signage, TCD | Relies on driver to complete the DDT and to supervise feature performance in real time | | Relies on ADS to perform complete DDT under defined conditions (fallback codition performance varies between levels) | | |
| CLASS A STATUS SHARING | Here I am and what I see | e.g., Brake Lights, Traffic Signal | Potential for improved object and event detection | | Potential for improved object and event detection[2] | | |
| CLASS B INTENT SHARING | This is what I plan to do | e.g., Turn Signal, Merge | Potential for improved object and event prediction | | Potential for improved object and event prediction | | |
| CLASS C AGREEMENT SEEKING | Let's do this together | e.g., Hand Signals Merge | N/A | | C-ADS designed to attain mutual goals through coordinated actions | | |
| CLASS D PRESCRIPTIVE | I will do as directed | e.g., Hand Signals, Lane Assignment by Officials | | | C-ADS designed to accept and adhere to a command | | |

FIG. 3

| FIRST DRIVING COOPERATION MESSAGE CLASS | RECEIVED MESSAGE CLASS | ADJUSTED COOPERATION CLASS |
|---|---|---|
| A, A+ | A, A+ | A |
| B | A | B |
| A | B | A |
| C(REQUEST) | C(RESPONSE) | C |
| C(RESPONSE) | C(REQUEST) | C |
| A, B, C | D | D |

FIG. 4

| COOPERATION CLASS | PARAMETER |
|---|---|
| Class B | 1) Start Distance (GENERATION)<br>2) End Distance (TERMINATION) |
| Class C | 1) Start Distance, Risk Threshold (GENERATION)<br>2) NegoDrivingDone Message (TERMINATION) |
| Class D | End Distance (TERMINATION) |

FIG. 6

METHOD AND APPARATUS FOR PROCESSING DRIVING COOPERATION MESSAGE

CROSS REFERENCE TO RELATED APPLICATION

This application claims the benefit of Korean Patent Application No. 10-2022-0064506, filed May 26, 2022, which is hereby incorporated by reference in its entirety into this application.

BACKGROUND OF THE INVENTION

1. Technical Field

The present disclosure relates generally to a message processing method for cooperative driving between autonomous vehicles.

2. Description of the Related Art

Generally, an Autonomous Driving System (ADS) is technology for selecting an optimal driving path and performing autonomous driving using lane-departure prevention technology, vehicle-change control technology, an obstacle avoidance control technology, etc. Such an autonomous driving system refers to technology related to the driving of a vehicle which autonomously reaches a destination even if a driver manipulates a steering wheel, a brake, etc.

An autonomous vehicle has classes ranging from level 0 to level 5 depending on automation levels. Here, level 1 to level 4 may premise the intervention of a driver, and level 5 may be regarded as complete autonomous driving because the intervention of a human being (driver) is not present.

In conventional technology, cooperation between vehicles is conducted in such a way that paths generated by an autonomous vehicle may be revised and supplemented by referring to messages sent from individual vehicles or based on information provided from a neighboring infrastructure system.

However, due to a recent increase in traffic volume, it may be slightly difficult to perform cooperation between autonomous vehicles using only messages sent from individual vehicles or information provided from a neighboring infrastructure system.

SUMMARY OF THE INVENTION

Accordingly, the present disclosure has been made keeping in mind the above problems occurring in the prior art, and an object of the present disclosure is to provide a method and apparatus for processing a driving cooperation message, which perform cooperative driving between autonomous vehicles through negotiation with a neighboring autonomous vehicle.

Another object of the present disclosure is to provide a method and apparatus for processing a driving cooperation message, which establish a basic strategy required for safe driving through negotiation with a neighboring autonomous vehicle.

In accordance with an aspect of the present disclosure to accomplish the above objects, there is provided a method for processing a driving cooperation message, including receiving multiple first driving cooperation messages from neighboring autonomous vehicles, adjusting cooperation classes of the multiple first driving cooperation messages, creating driving strategies corresponding to the adjusted cooperation classes in descending order of priorities of the adjusted cooperation classes, generating second driving cooperation messages including the adjusted cooperation classes and the driving strategies corresponding to the adjusted cooperation classes, and sending the second driving cooperation messages to the neighboring autonomous vehicles requiring cooperative driving.

The cooperation classes may include at least one of class A which is a cooperative driving class through sharing of a driving status, class B which is a cooperative driving class through sharing of a driving intent, class C which is a cooperative driving class through driving cooperation, or class D which is a cooperative driving class through prescriptive cooperation, or a combination thereof, and priorities of the cooperation classes are determined in an order of the class D, the class C, the class B, and the class A.

Among the adjusted cooperation classes, the class A and the class B may be adjusted based on cooperation classes of the first driving cooperation messages sent from the neighboring autonomous vehicles.

Among the adjusted cooperation classes, the class C and the class D may be classes, a priority of which is identical to that of cooperation classes of the first driving cooperation messages sent from the neighboring autonomous vehicles, or are adjusted to classes, a priority of which is higher than that of the cooperation classes of the first driving cooperation messages.

When multiple first driving cooperation messages having the adjusted cooperation classes are present, the second driving cooperation messages may be generated in an order in which the first driving cooperation messages are received.

When a first driving cooperation message having an adjusted cooperation class, a priority of which is higher than that of a currently adjusted cooperation class, is received, a second driving cooperation message may be generated based on the first driving cooperation message having the adjusted cooperation class, the priority of which is higher.

The method may further include, when driving negotiation with a corresponding one of the neighboring autonomous vehicles is completed based on the second driving cooperation messages, performing cooperative driving with the corresponding neighboring autonomous vehicle with which the driving negotiation is completed.

When a cooperation class of a corresponding first driving cooperation messages is the class D, generating the second driving cooperation messages and sending the second driving cooperation messages to the neighboring autonomous vehicles may be skipped.

The method may further include setting a parameter value for executing the driving strategies, and generating the second driving cooperation messages based on the set parameter value.

In accordance with another aspect of the present disclosure to accomplish the above objects, there is provided an apparatus for processing a driving cooperation message, including memory configured to store a control program for processing a driving cooperation message; and a processor configured to execute the control program, wherein the processor is configured to receive multiple first driving cooperation messages from neighboring autonomous vehicles, adjust cooperation classes of the multiple first driving cooperation messages, create driving strategies corresponding to the adjusted cooperation classes in descending order of priorities of the adjusted cooperation classes, generate second driving cooperation messages including the adjusted cooperation classes and the driving strategies corresponding to the adjusted cooperation classes, and send the second driving cooperation messages to the neighboring autonomous vehicles requiring cooperative driving.

The cooperation classes may include at least one of class A which is a cooperative driving class through sharing of a driving status, class B which is a cooperative driving class through sharing of a driving intent, class C which is a cooperative driving class through driving cooperation, or class D which is a cooperative driving class through prescriptive cooperation, or a combination thereof, and priorities of the cooperation classes are determined in an order of the class D, the class C, the class B, and the class A.

Among the adjusted cooperation classes, the class A and the class B are adjusted based on cooperation classes of the first driving cooperation messages sent from the neighboring autonomous vehicles.

Among the adjusted cooperation classes, the class C and the class D may be classes, a priority of which is identical to that of cooperation classes of the first driving cooperation messages sent from the neighboring autonomous vehicles, or may be adjusted to classes, a priority of which is higher than that of the cooperation classes of the first driving cooperation messages.

When multiple first driving cooperation messages having the adjusted cooperation classes are present, the second driving cooperation messages may be generated in an order in which the first driving cooperation messages are received.

When a first driving cooperation message having an adjusted cooperation class, a priority of which is higher than that of a currently adjusted cooperation class, is received, a second driving cooperation message may be generated based on the first driving cooperation message having the adjusted cooperation class, the priority of which is higher.

When driving negotiation with a corresponding one of the neighboring autonomous vehicles is completed based on the second driving cooperation messages, cooperative driving with the corresponding neighboring autonomous vehicle, with which the driving negotiation is completed, is performed.

When a cooperation class of a corresponding first driving cooperation messages is the class D, generation of the second driving cooperation messages and sending of the second driving cooperation messages to the neighboring autonomous vehicles may be skipped.

A parameter value for executing the driving strategies may be set, and the second driving cooperation messages are generated based on the set parameter value.

BRIEF DESCRIPTION OF THE DRAWINGS

The above and other objects, features and advantages of the present disclosure will be more clearly understood from the following detailed description taken in conjunction with the accompanying drawings, in which:

FIG. 3 is a diagram illustrating cooperation classes depending on an autonomous driving mode;

FIG. 4 is a diagram for explaining a process of adjusting cooperation classes according to an embodiment;

FIG. 6 is a diagram for explaining parameters corresponding to class B, class C, and class D;

DESCRIPTION OF THE PREFERRED EMBODIMENTS

Figure 1:
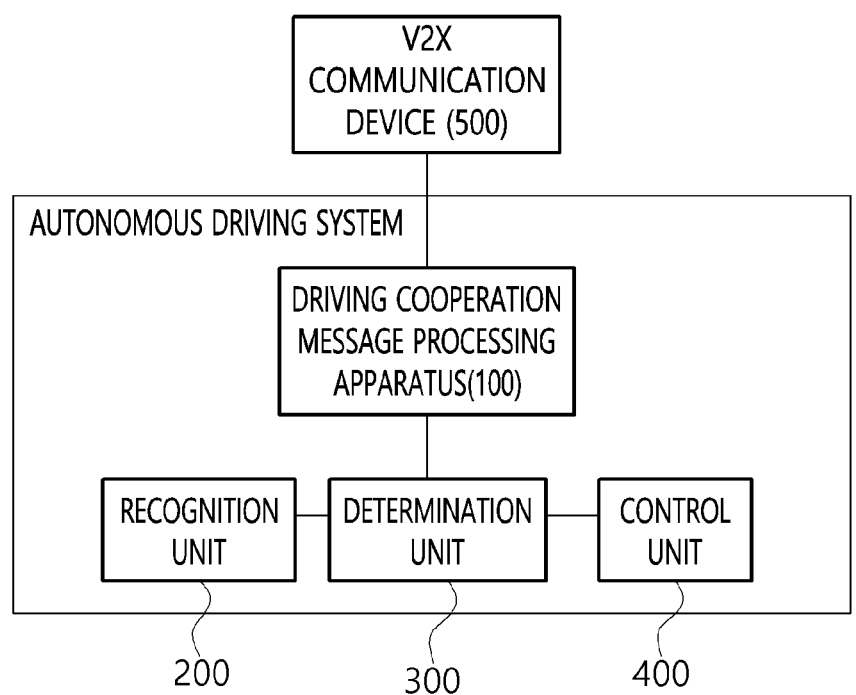
FIG. 1 is a diagram illustrating a autonomous vehicle control apparatus provided with a driving cooperation message processing apparatus according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a diagram illustrating the configuration of an autonomous vehicle control apparatus provided with an apparatus for processing a driving cooperation message (hereinafter also referred to as a "driving cooperation message processing apparatus") according to an embodiment of the present disclosure.

Referring to FIG. 1, the autonomous vehicle control apparatus according to the embodiment may include an autonomous driving system (ADS) for autonomous driving and a vehicle-to-everything (V2X) communication device 500 for external communication, wherein the autonomous driving system (ADS) may communicate with an external system through the V2X communication device 500.

The V2X communication device 500 may send/receive driving cooperation messages to/from neighboring autonomous vehicles. In addition, the V2X communication device 500 may transmit/receive pieces of external information such as a traffic situation related to autonomous driving and neighboring objects.

Individual components of the autonomous driving system (ADS) may be implemented as systems or software components.

The autonomous driving system (ADS) may control the motion of the corresponding autonomous vehicle based on a driving strategy. The autonomous driving system (ADS) may process a driving cooperation message required for performing cooperative driving between autonomous vehicles.

Individual components of the autonomous vehicle control apparatus may be implemented as systems or software components.

The autonomous driving system (ADS) may include a driving cooperation message processing apparatus 100, a recognition unit 200, a determination unit 300, and a control unit 400. Here, the determination unit 300 may be integrated with the driving cooperation message processing apparatus 100 into a single component, but they will be separately described for convenience of description.

The driving cooperation message processing apparatus 100 may determine priorities for driving cooperation messages that are sent/received between autonomous vehicles for cooperative driving between the autonomous vehicles depending on cooperation classes, and may then establish driving strategies for safe driving. The driving cooperation message processing apparatus 100 will be described in detail later.

The recognition unit 200 may function to recognize the status information of neighboring objects. The neighboring objects may include, but are not limited to, a sign in a construction site, a rubber cone, an accident vehicle, a neighboring vehicle, a pedestrian (PED), bike, an animal, an emergency vehicle, etc. The neighboring objects may be divided into dynamic objects and static objects. The recognition unit 200 may recognize the status information of the neighboring objects from light detection and ranging (Lidar), cameras, radar, a vehicle sensor, etc., which are installed in each autonomous vehicle.

The determination unit 300 may perform a determination process required by the autonomous driving system (ADS) and the driving cooperation message processing apparatus 100.

For example, the determination unit 300 may create driving strategies suitable for cooperation classes based on the cooperation classes adjusted by the driving cooperation message processing apparatus 100. The determination unit 300 may transfer the created driving strategies to the driving cooperation message processing apparatus 100.

The control unit 400 may control the motion of the corresponding autonomous vehicle to correspond to the cooperative driving between the autonomous vehicles, but the present disclosure is not limited thereto. The control unit 400 may be, but is not limited to, a Minimal Risk Maneuver (MRM) module.

Figure 2:
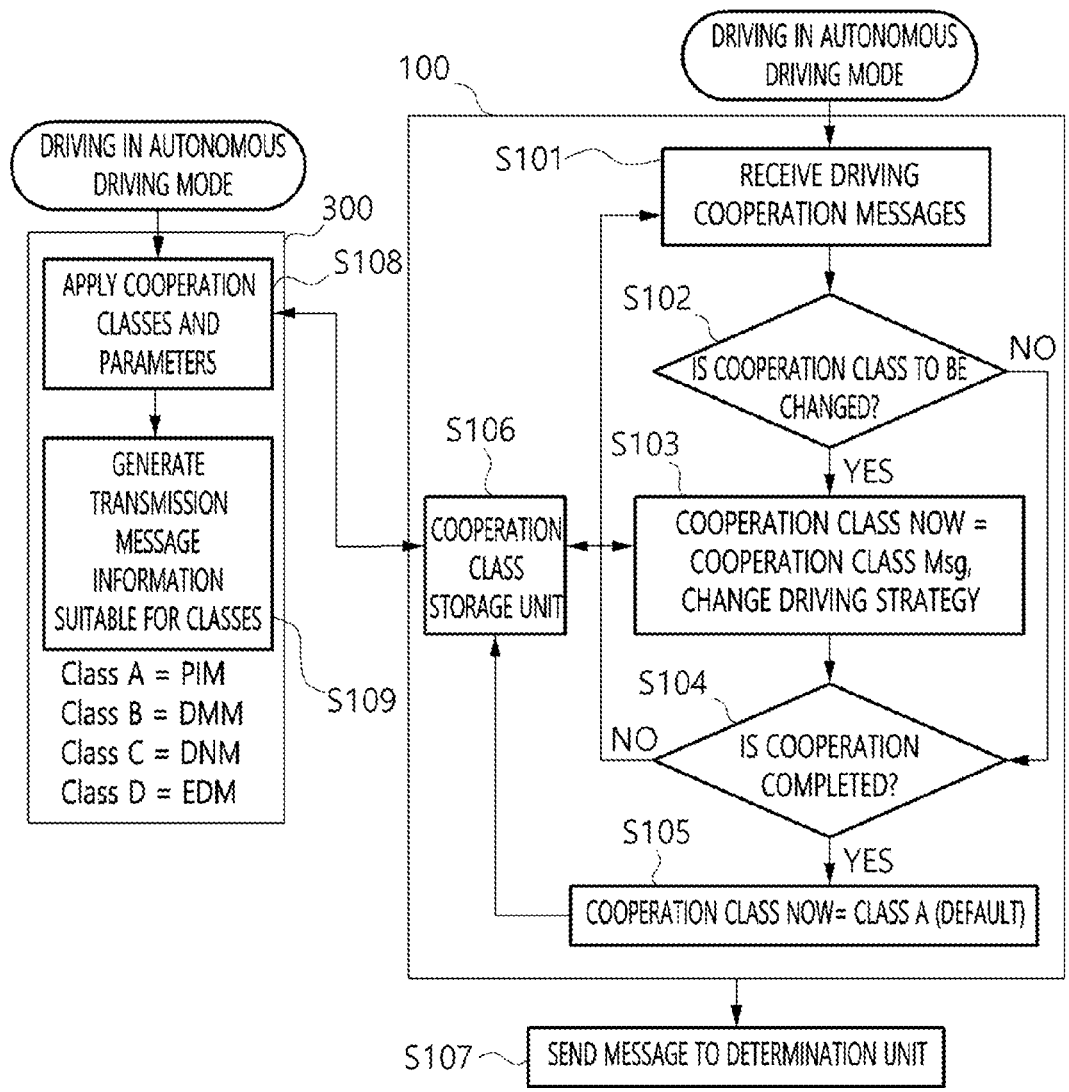
FIG. 2 is a diagram for explaining a process in which a driving cooperation message processing apparatus according to an embodiment of the present disclosure processes a driving cooperation message.

FIG. 2 is a diagram for explaining a process in which a driving cooperation message processing apparatus according to an embodiment of the present disclosure processes a driving cooperation message. Here, a process of processing a driving cooperation message may also be performed by an autonomous driving system.

As illustrated in FIG. 2, while traveling in an autonomous driving mode, multiple neighboring autonomous vehicles may generate first driving cooperation messages. Because the driving cooperation message processing apparatus may be confused to utilize information due to the first driving cooperation messages poured from the multiple neighboring autonomous vehicles, the driving cooperation message processing apparatus may conduct processing corresponding to priorities so that the cooperation classes of the first driving cooperation messages received from the neighboring autonomous vehicles are flexibly adjusted and driving strategies are reflected in the processing.

The driving cooperation message processing apparatus according to the embodiment may receive respective first driving cooperation messages from multiple neighboring autonomous vehicles at step S101.

The driving cooperation message processing apparatus may determine whether the cooperation class of each first driving cooperation message is to be changed at step S102.

FIG. 3 is a diagram illustrating cooperation classes depending on an autonomous driving mode.

As illustrated in FIG. 3, the autonomous driving mode may be composed of level 0 to level 5, and the cooperation classes are standardized into class A, class B, class C, and class D in consideration of the performance of a Dynamic Driving Task (DDT) and the influence thereof on the traffic management or the like.

Class A may be a cooperative driving class for sharing driving status. class A may indicate status-sharing cooperation, and may be cooperation performed through information about recognition of a traffic environment provided by a transmission entity. The status-sharing cooperation may be utilized to receive information from neighboring traffic participants and to improve the situation recognition performance (i.e., context awareness performance) of the corresponding entity.

Class B may be a cooperative driving class through the sharing of a driving intent. Class B may be utilized to extend the prediction of future status by exploiting information about a planed future action provided by a transmitting entity via intent sharing cooperation.

Class C may be a cooperative driving class for driving cooperation. Class C may exchange a series of cooperative messages between specific Cooperative Driving Automation (CDA) devices intended to influence a local planed for a specific DDT-related operation via agreement seeking cooperation. Here, a CDA device agent does not need to conform to planed future actions, and all entities may conduct a suitable task regardless of the actions of other entities.

Class D may be a cooperative driving class based on prescriptive cooperation. Class D prescribes prompt performance of DDT via prescriptive cooperation, and needs to have the authority to control the action of the CDA device which receives class D.

Priorities for the above-described cooperation classes may be determined in the order of class D, class C, class B, and class A.

Referring back to FIG. 2, when it is determined that the change of the cooperation class of the first driving cooperation message is required, the driving cooperation message processing apparatus according to the embodiment may perform a process of adjusting the cooperation class of the first driving cooperation message at step S103. The start class for driving cooperation may be initiated at class A.

FIG. 4 is a diagram for explaining a process of adjusting the cooperation classes according to an embodiment.

As illustrated in FIG. 4, for the adjusted cooperation classes, that is, class A and class B, cooperation levels are determined based on first driving cooperation messages, which are transmission messages. Further, when class C and class D are received, the cooperation classes may be upgraded to class C or class D, thus enabling cooperative processing for agreement seeking and prescriptive cooperation to be performed.

Since a cooperation leader is designated in unicast-based class C, transmission and reception do not simultaneously occur, and unicast-based class C may be changed to class C only when agreement on a cooperation request is gained. Class D enables only reception. Therefore, in class D, a process of generating and sending second driving cooperation messages may be skipped.

Referring back to FIG. 2, the driving cooperation message processing apparatus according to the embodiment may store the adjusted cooperation classes in a cooperation class storage unit at step S106, and may initialize the adjusted cooperation classes to class A when cooperation is completed at steps S104 and S105.

The driving cooperation message processing apparatus according to the embodiment may transfer the adjusted cooperation classes to the determination unit at step S107. The determination unit may apply the cooperation classes and parameters at step S108, and may generate second driving cooperation messages that is transmission messages including the adjusted cooperation classes and driving strategies suitable for the cooperation classes at step S109.

Figure 5:
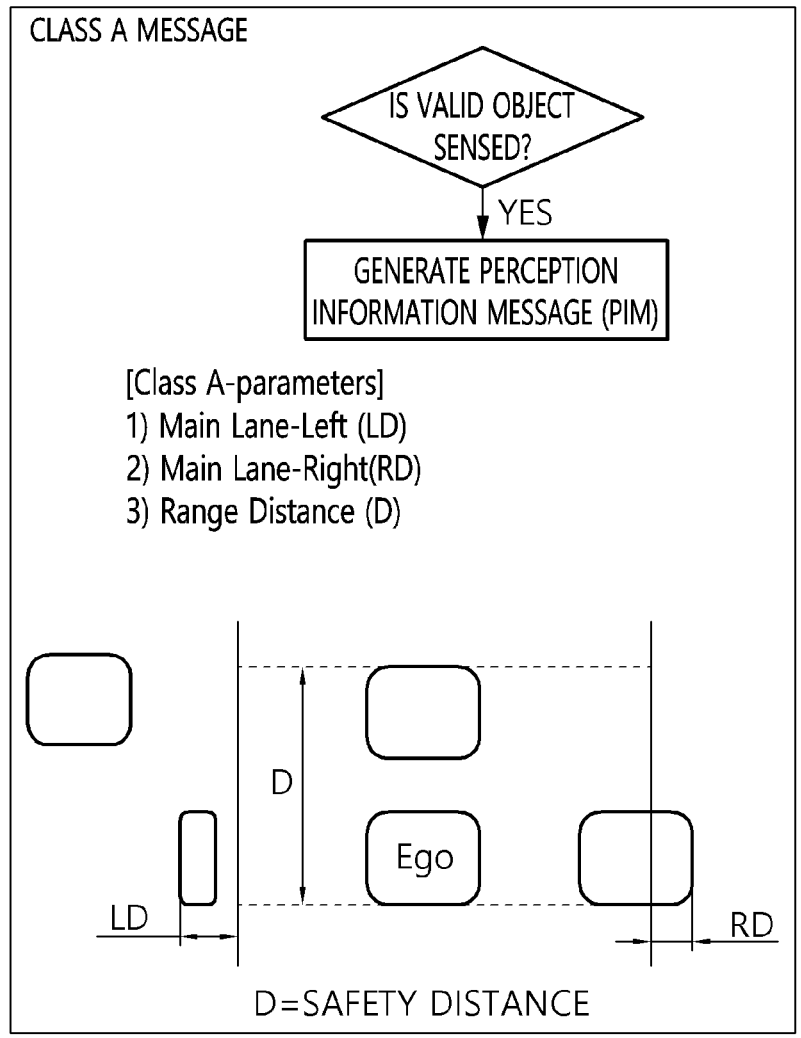
FIG. 5 is a diagram for explaining parameters corresponding to class A.

FIG. 5 is a diagram for explaining parameters corresponding to class A.

As illustrated in FIG. 5, a Perception Information Message (PIM) of class A that is the most basic class is not generated for all recognized objects, and may be generated only when a valid object is present. Therefore, the distance that may influence the generation of a message suitable for class A may be applied as a main parameter to generate a PIM.

As parameters and reference values that may influence the generation of a driving cooperation message, values previously agreed with the driving cooperation message processing apparatus and the determination unit may be preferentially applied depending on the driving environment. When the determination unit changes the values depending on the situation, a history of the change may be stored in the cooperation class storage unit.

FIG. 6 is a diagram for explaining parameters corresponding to class B, class C, and class D.

As illustrated in FIG. 6, for class B, the value of a start distance at which the generation of a message starts and the value of an end distance at which the generation of the message ends may be stored in a cooperation class storage unit.

For example, delay management message (DMM) of class B is generated based on an event occurring first between an event corresponding to 30 m (100 m in the case of an expressway) before the location where an action of changing the lane or passing through an intersection will occur and an event corresponding to the operation of a turn signal. When the distance to the location at which the corresponding action will occur is shorter than 5 m, the cooperative driving corresponding to class B may be terminated.

In this case, distance references such as 30 m/100 m are normal guideline distances for the use of a turn signal in driving on the road, and an example such as 5 m is the minimum safety distance to be kept by the autonomous vehicle from a vehicle in front during traveling, and thus it may be assumed that no obstacle is present while moving to a destination within 5 m.

Even if an action such as lane change or intersection passing occurs, there is no need to generate a message corresponding to class C unless a risk of a collision with a neighboring vehicle occurs. Therefore, for class C, a risk threshold value may be further set in addition to the start distance.

The termination of class C is performed such that class C is maintained until a cooperation leader sends or receives a NegoDrivingDone message indicating that cooperation has been completed.

However, in the case where a message corresponding to class D is received while class C is being processed, a message indicating that negotiation on class C has stopped may be first sent, after which class C is upgraded to class D at the same time that a driving strategy may be revised.

Because class D enables only reception, a time at which the strategy corresponding to class D is to be terminated may be determined based on an end distance.

When the processing of the class corresponding to the current cooperation level is completed, the driving cooperation message processing apparatus may reset the class of a cooperation level to class A (default). Further, the driving cooperation message processing apparatus may adjust a V2V communication cycle with a neighboring vehicle in conformity with a current cooperation class and a message generation criterion.

Meanwhile, when multiple first driving cooperation messages having the identical adjusted cooperation class are present, the driving cooperation message processing apparatus according to the embodiment may generate adjusted cooperation classes and driving strategies in the order in which the first driving cooperation messages are received.

Furthermore, the driving cooperation message processing apparatus according to the embodiment is configured such that, when a first driving cooperation message having an adjusted cooperation class, the priority of which is higher than that of the adjusted cooperation classes is received, an adjusted cooperation class and an adjusted driving strategy may be generated based on the first driving cooperation message having the adjusted cooperation class, with higher priority.

The driving cooperation message processing apparatus according to the embodiment may send a second driving cooperation message including the adjusted cooperation class and the adjusted driving strategy to a neighboring autonomous vehicle requiring cooperative driving through a V2X communication device.

Figure 7:
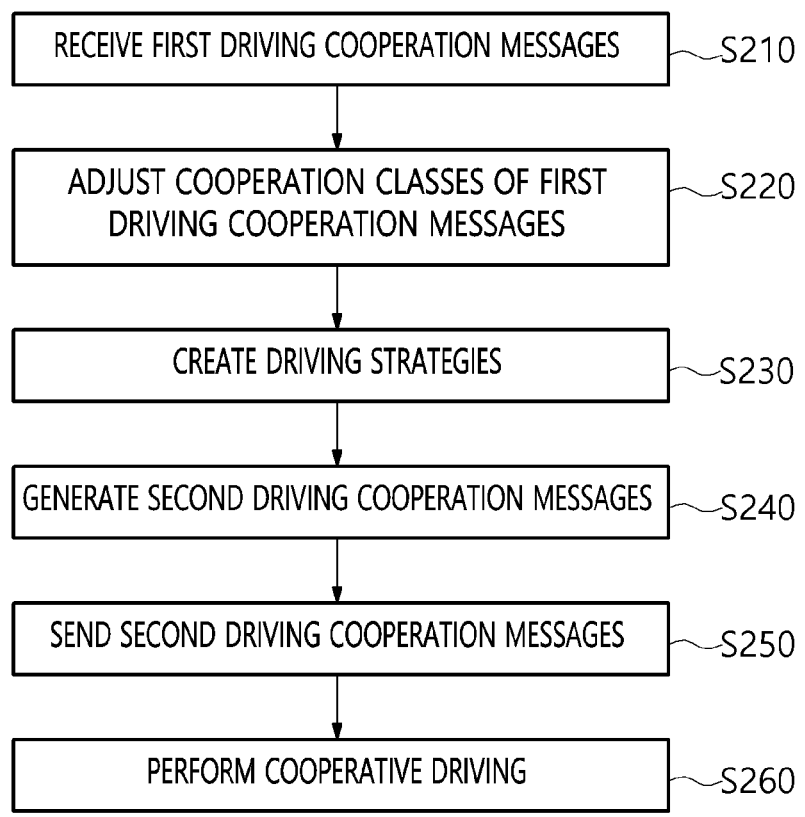
FIG. 7 is a flowchart illustrating a driving cooperation message processing method and an autonomous vehicle control method, which are performed by an autonomous vehicle control apparatus including a driving cooperation message processing apparatus according to an embodiment.

FIG. 7 is a flowchart illustrating a driving cooperation message processing method and an autonomous vehicle control method, which are performed by an autonomous vehicle control apparatus including a driving cooperation message processing apparatus according to an embodiment.

As illustrated in FIG. 7, the autonomous vehicle control apparatus may receive multiple first driving cooperation messages from neighboring autonomous vehicles through a driving cooperation message processing apparatus at step S210.

The autonomous vehicle control apparatus may adjust the cooperation classes of the multiple first driving cooperation messages through the driving cooperation message processing apparatus at step S220.

The autonomous vehicle control apparatus may create driving strategies corresponding to the adjusted cooperation classes in descending order of priorities of the adjusted cooperation classes through the driving cooperation message processing apparatus at step S230.

The autonomous vehicle control apparatus may generate second driving cooperation messages including the adjusted cooperation classes and the adjusted driving strategies through the driving cooperation message processing apparatus at step S240.

The autonomous vehicle control apparatus may send the second driving cooperation messages through the V2X communication device at step S250.

The autonomous vehicle control apparatus may perform driving negotiation with neighboring autonomous vehicles based on the second driving cooperation messages, and may perform cooperative driving with the corresponding neighboring autonomous vehicle when driving negotiation is completed at step S260.

Figure 8:
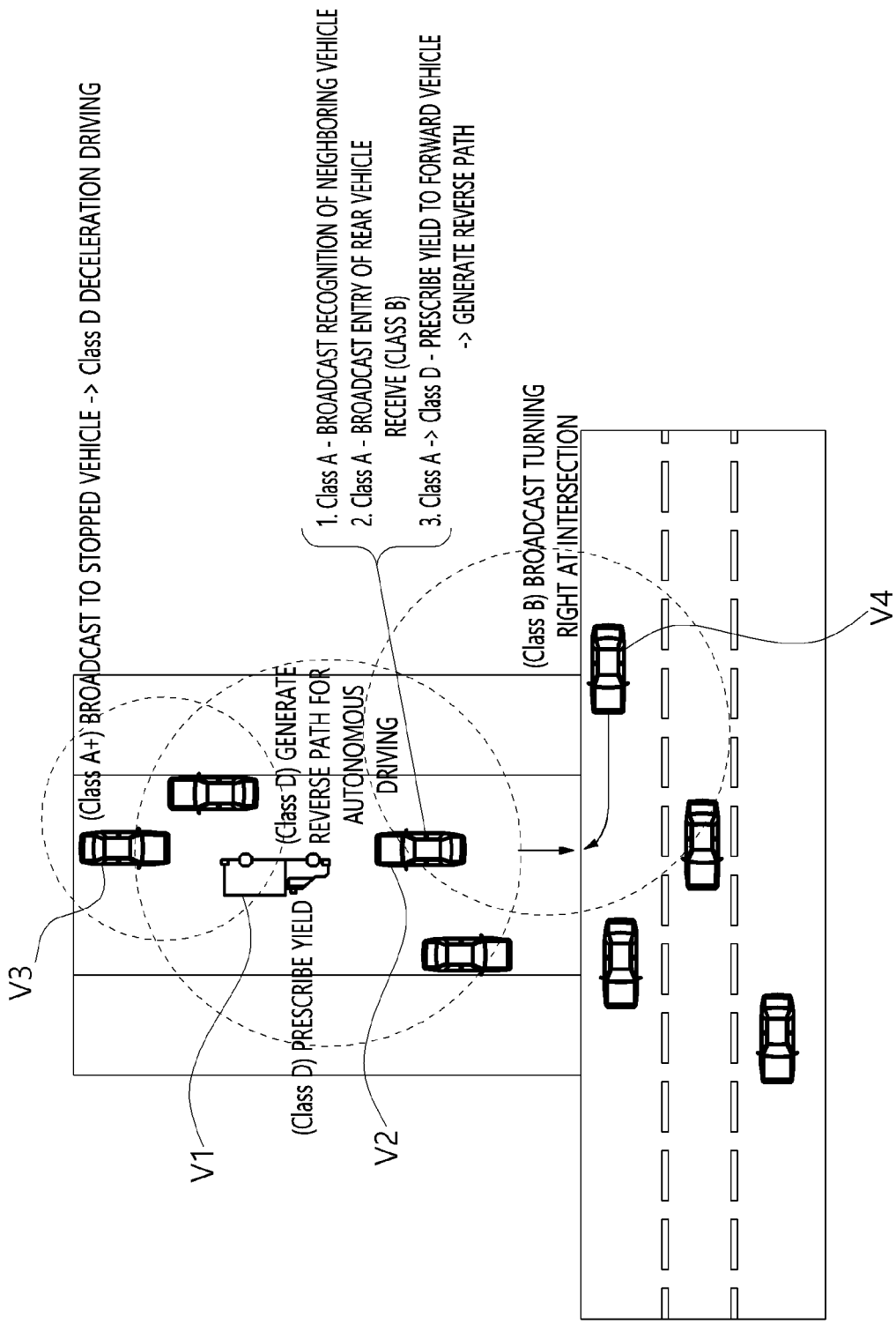
FIGS. 8 and 9 are diagrams illustrating embodiments of a multi-cooperation level message environment.
Figure 9:
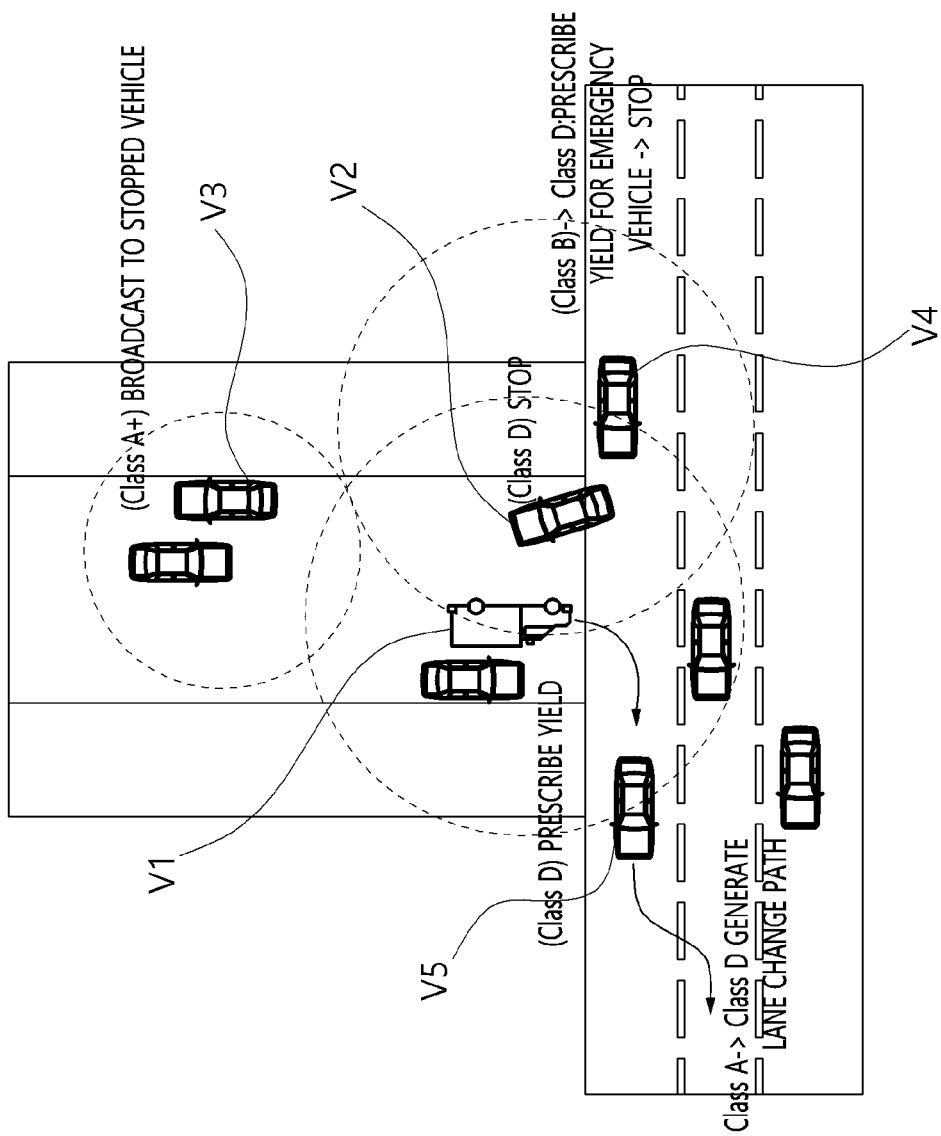

FIGS. 8 and 9 are diagrams illustrating an embodiment in a multi-cooperation level message environment.

As illustrated in FIG. 8, when a first vehicle, which is an emergency vehicle, broadcasts a prescription for yield corresponding to a cooperation class at class D, a second vehicle falling within a valid range of the travel path of the first vehicle may generate a reverse path.

A third vehicle falling within a valid range of the opposite travel path of the first vehicle may travel while reducing the speed thereof.

As illustrated in FIG. 9, a second vehicle V2 may stop when a first vehicle V1, which is an emergency vehicle, approaches the second vehicle V2, and a fourth vehicle V4 closer to the second vehicle V2 may also stop. When a third vehicle V3 falls out of the valid range of the first vehicle V1, the third vehicle V3 may be reset to class A.

Meanwhile, a fifth vehicle V5 entering the valid range of the travel path of the first vehicle V1 may generate a lane change path and execute a driving policy for yielding the lane to the first vehicle V1.

Figure 10:
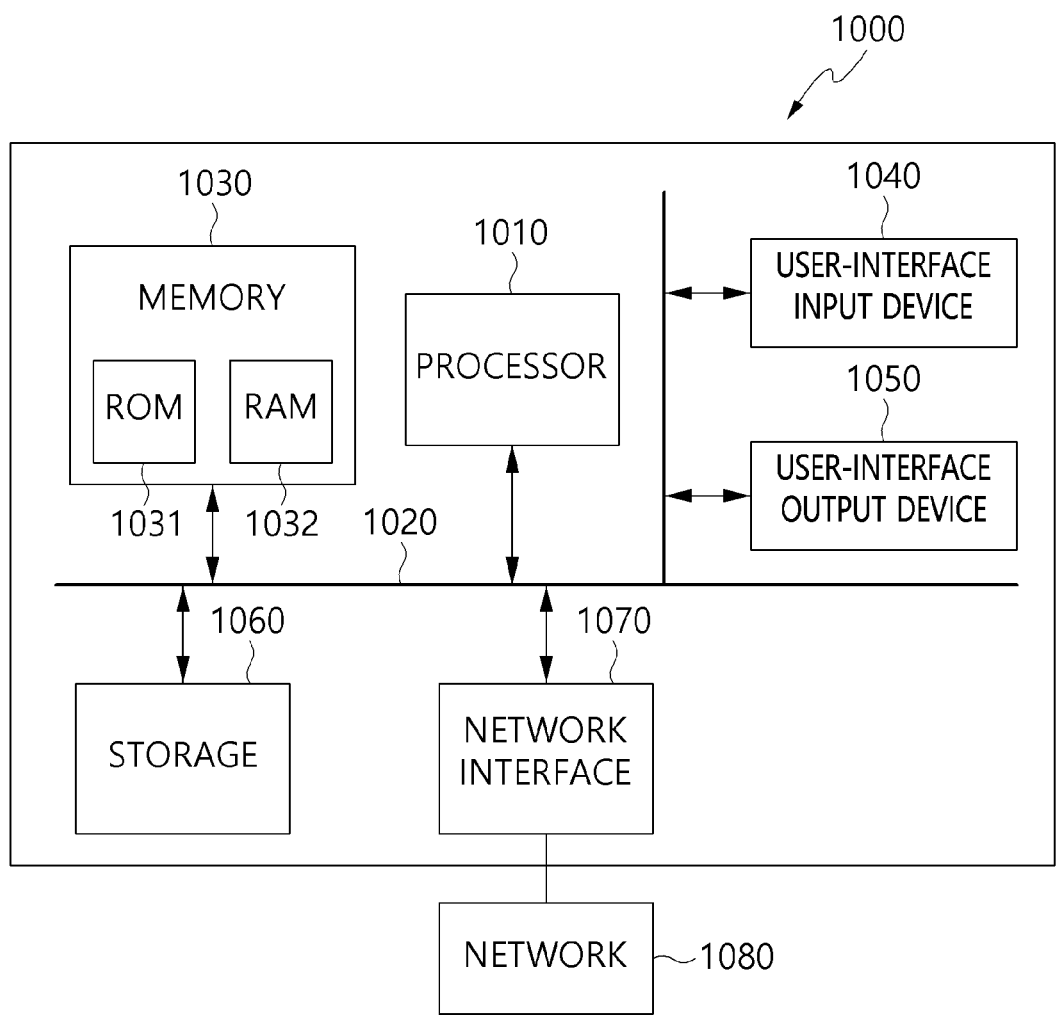
FIG. 10 is a block diagram illustrating the configuration of a computer system according to an embodiment of the present disclosure.

FIG. 10 is a block diagram illustrating the configuration of a computer system according to an embodiment of the present disclosure.

A driving cooperation message processing apparatus according to an embodiment may be implemented in a computer system such as a computer-readable storage medium (an electronic control unit (ECU) or a microcontroller unit (MCU)).

Referring to FIG. 10, a computer system 1000 according to an embodiment may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the driving cooperation message processing apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing a driving cooperation message processing method according to an embodiment. In detail, the memory 1030 may store multiple applications executed by the driving cooperation message processing apparatus, and data and instructions for the operation of the driving cooperation message processing apparatus.

The memory 1030 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

In accordance with an embodiment, a computer-readable storage medium for storing a computer program may include instructions enabling the processor to perform a method including the steps of receiving multiple first driving cooperation messages from neighboring autonomous vehicles, adjusting cooperation classes of the multiple first driving cooperation messages, creating driving strategies corresponding to the adjusted cooperation classes in descending order of priorities of the adjusted cooperation classes, generating second driving cooperation messages including the adjusted cooperation classes and the driving strategies corresponding to the adjusted cooperation classes, and sending the second driving cooperation messages to the neighboring autonomous vehicles requiring cooperative driving.

In accordance with an embodiment, a computer program stored in a computer-readable storage medium may include instructions enabling the processor to perform a method including the steps of receiving multiple first driving cooperation messages from neighboring autonomous vehicles, adjusting cooperation classes of the multiple first driving cooperation messages, creating driving strategies corresponding to the adjusted cooperation classes in descending order of priorities of the adjusted cooperation classes, generating second driving cooperation messages including the adjusted cooperation classes and the driving strategies corresponding to the adjusted cooperation classes, and sending the second driving cooperation messages to the neighboring autonomous vehicles requiring cooperative driving.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

In accordance with the present disclosure, a driving priority and a driving strategy may be generated through negotiation with multiple neighboring vehicles, and thus a driving strategy suitable for a situation may be provided.

Further, the present disclosure may realize safer autonomous driving by adjusting the cooperation classes of driving cooperation messages through negotiation with neighboring vehicles.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for processing a driving cooperation message, comprising:
   receiving multiple first driving cooperation messages from neighboring autonomous vehicles;
   adjusting cooperation classes of the multiple first driving cooperation messages;
   creating driving strategies corresponding to the adjusted cooperation classes in descending order of priorities of the adjusted cooperation classes;
   setting a parameter value for executing the driving strategies;
   generating second driving cooperation messages including the adjusted cooperation classes and the driving strategies corresponding to the adjusted cooperation classes, the second driving cooperation messages generated based on the set parameter value; and
   sending the second driving cooperation messages to the neighboring autonomous vehicles requiring cooperative driving,
   wherein, when a first driving cooperation message having an adjusted cooperation class, a priority of which is higher than that of a currently adjusted cooperation class, is received, a second driving cooperation message is generated based on the first driving cooperation message having the adjusted cooperation class, the priority of which is higher.

2. The method of claim 1, wherein the cooperation classes comprise at least one of class A which is a cooperative driving class through sharing of a driving status, class B which is a cooperative driving class through sharing of a driving intent, class C which is a cooperative driving class through driving cooperation, or class D which is a cooperative driving class through prescriptive cooperation, or a combination thereof, and priorities of the cooperation classes are determined in an order of the class D, the class C, the class B, and the class A.

3. The method of claim 2, wherein, among the adjusted cooperation classes, the class C and the class D are classes, a priority of which is identical to that of cooperation classes of the first driving cooperation messages sent from the neighboring autonomous vehicles, or are adjusted to classes, a priority of which is higher than that of the cooperation classes of the first driving cooperation messages.

4. The method of claim 2, wherein when a cooperation class of a corresponding first driving cooperation messages is the class D, generating the second driving cooperation messages and sending the second driving cooperation messages to the neighboring autonomous vehicles are skipped.

5. The method of claim 1, wherein, when multiple first driving cooperation messages having the adjusted cooperation classes are present, the second driving cooperation messages are generated in an order in which the first driving cooperation messages are received.

6. The method of claim 1, further comprising:
   when driving negotiation with a corresponding one of the neighboring autonomous vehicles is completed based on the second driving cooperation messages, performing cooperative driving with the corresponding neighboring autonomous vehicle with which the driving negotiation is completed.

7. A method for processing a driving cooperation message, comprising:
   receiving multiple first driving cooperation messages from neighboring autonomous vehicles;
   adjusting cooperation classes of the multiple first driving cooperation messages;
   creating driving strategies corresponding to the adjusted cooperation classes in descending order of priorities of the adjusted cooperation classes;
   setting a parameter value for executing the driving strategies;
   generating second driving cooperation messages including the adjusted cooperation classes and the driving strategies corresponding to the adjusted cooperation classes, the second driving cooperation messages generated based on the set parameter value; and
   sending the second driving cooperation messages to the neighboring autonomous vehicles requiring cooperative driving,
   wherein, the cooperation classes comprise at least one of class A which is a cooperative driving class through sharing of a driving status, class B which is a cooperative driving class through sharing of a driving intent, class C which is a cooperative driving class through driving cooperation, or class D which is a cooperative driving class through prescriptive cooperation, or a combination thereof,
   priorities of the cooperation classes are determined in an order of the class D, the class C, the class B, and the class A, and
   among the adjusted cooperation classes, the class A and the class B are adjusted based on cooperation classes of the first driving cooperation messages sent from the neighboring autonomous vehicles.

8. An apparatus for processing a driving cooperation message, comprising:
   a memory configured to store a control program for processing a driving cooperation message; and
   a processor configured to execute the control program,
   wherein the processor is configured to receive multiple first driving cooperation messages from neighboring autonomous vehicles, adjust cooperation classes of the multiple first driving cooperation messages, create driving strategies corresponding to the adjusted cooperation classes in descending order of priorities of the adjusted cooperation classes, generate second driving cooperation messages including the adjusted cooperation classes and the driving strategies corresponding to the adjusted cooperation classes, and send the second driving cooperation messages to the neighboring autonomous vehicles requiring cooperative driving,
   when a first driving cooperation message having an adjusted cooperation class, a priority of which is higher than that of a currently adjusted cooperation class, is received, a second driving cooperation message is generated based on the first driving cooperation message having the adjusted cooperation class, the priority of which is higher, and a parameter value for executing the driving strategies is set, and the second driving cooperation messages are generated based on the set parameter value.

9. The apparatus of claim 8, wherein the cooperation classes comprise at least one of class A which is a cooperative driving class through sharing of a driving status, class B which is a cooperative driving class through sharing of a driving intent, class C which is a cooperative driving class through driving cooperation, or class D which is a cooperative driving class through prescriptive cooperation, or a combination thereof, and priorities of the cooperation classes are determined in an order of the class D, the class C, the class B, and the class A.

10. The apparatus of claim 9, wherein, among the adjusted cooperation classes, the class A and the class B are adjusted based on cooperation classes of the first driving cooperation messages sent from the neighboring autonomous vehicles.

11. The apparatus of claim 9, wherein, among the adjusted cooperation classes, the class C and the class D are classes, a priority of which is identical to that of cooperation classes of the first driving cooperation messages sent from the neighboring autonomous vehicles, or are adjusted to classes, a priority of which is higher than that of the cooperation classes of the first driving cooperation messages.

12. The apparatus of claim 9, wherein, when a cooperation class of a corresponding first driving cooperation messages is the class D, generation of the second driving cooperation messages and sending of the second driving cooperation messages to the neighboring autonomous vehicles are skipped.

13. The apparatus of claim 8, wherein, when multiple first driving cooperation messages having the adjusted cooperation classes are present, the second driving cooperation messages are generated in an order in which the first driving cooperation messages are received.

14. The apparatus of claim 8, wherein, when driving negotiation with a corresponding one of the neighboring autonomous vehicles is completed based on the second driving cooperation messages, cooperative driving with the corresponding neighboring autonomous vehicle, with which the driving negotiation is completed, is performed.

* * * * *